(12) United States Patent
Cook et al.

(10) Patent No.: US 11,319,238 B2
(45) Date of Patent: May 3, 2022

(54) GLASS MANUFACTURING APPARATUS AND METHODS

(71) Applicant: Corning Incorporated, Corning, NY (US)

(72) Inventors: Mark Alan Cook, Painted Post, NY (US); Franck Olivier Hounkpevi, Painted Post, NY (US); Pierre Laronze, Corning, NY (US)

(73) Assignee: Corning Incorporated, Corning, NY (US)

( * ) Notice: Subject to any disclaimer, the term of this patent is extended or adjusted under 35 U.S.C. 154(b) by 526 days.

(21) Appl. No.: 16/327,092

(22) PCT Filed: Aug. 16, 2017

(86) PCT No.: PCT/US2017/047232
§ 371 (c)(1),
(2) Date: Feb. 21, 2019

(87) PCT Pub. No.: WO2018/039002
PCT Pub. Date: Mar. 1, 2018

(65) Prior Publication Data
US 2021/0276910 A1    Sep. 9, 2021

Related U.S. Application Data

(60) Provisional application No. 62/378,950, filed on Aug. 24, 2016.

(51) Int. Cl.
*C03B 7/00*    (2006.01)
*C03B 17/06*    (2006.01)

(52) U.S. Cl.
CPC ............ *C03B 7/005* (2013.01); *C03B 17/064* (2013.01)

(58) Field of Classification Search
CPC combination set(s) only.
See application file for complete search history.

(56) References Cited

U.S. PATENT DOCUMENTS 1,750,967 A * 3/1930 Rule ....................... C03B 7/086
65/129
2,569,459 A * 10/1951 De Voe ................. C03B 5/1875
65/135.4
(Continued)

FOREIGN PATENT DOCUMENTS

CN    201883015 U    6/2011
CN    102596828 A    7/2012
(Continued)

OTHER PUBLICATIONS

JPH0848528A_-_Stirring_method_and_stirring_device_of_glass_-_Google_Patents_translation.pdf (Year: 1994).*
(Continued)

*Primary Examiner* — Jodi C Franklin (57) ABSTRACT

A method of controlling a flowrate of molten material at a downstream location in a glass manufacturing process can include mixing the molten material at an upstream location positioned upstream from the downstream location relative to a flow direction of the molten material with a shaft including a plurality of protrusions. The method can also include measuring a torque of the shaft, measuring a level of the molten material at the upstream location, and calculating a viscosity of the molten material at the upstream location based on the measured torque and the measured level. In addition, the method can include estimating the flowrate based on the calculated viscosity, and controlling the flowrate at the downstream location based on the estimated flowrate.

20 Claims, 3 Drawing Sheets

(56) References Cited

U.S. PATENT DOCUMENTS

| | | | |
|---|---|---|---|
| 2,570,078 A * | 10/1951 | Spremulli | C03B 7/092 |
| | | | 65/180 |
| 3,162,038 A | 12/1964 | Roberson et al. | |
| 3,239,325 A | 3/1966 | Roberson et al. | |
| 3,380,463 A | 4/1968 | Trethewey | |
| 3,420,649 A * | 1/1969 | Lewis, Jr. | C03B 17/04 |
| | | | 65/66 |
| 3,573,016 A | 3/1971 | Rees | |
| 4,004,900 A | 1/1977 | Staahl, Jr. et al. | |
| 4,011,070 A | 3/1977 | Hynd | |
| 4,277,274 A | 7/1981 | Chrisman | |
| 4,278,460 A * | 7/1981 | Chrisman | C03B 5/1875 |
| | | | 366/266 |
| 4,877,436 A | 10/1989 | Sheinkop Isac | |
| 5,773,712 A | 6/1998 | Arvidsson et al. | |
| 6,250,136 B1 | 6/2001 | Igreja | |
| 6,640,617 B2 | 11/2003 | Sch?b et al. | |
| 7,127,919 B2 | 10/2006 | Goller et al. | |
| 7,735,340 B2 | 6/2010 | Burdette et al. | |
| 8,256,951 B2 * | 9/2012 | Adelsberg | C03B 5/187 |
| | | | 366/328.1 |
| 9,388,065 B2 | 7/2016 | Agrawal et al. | |
| 2006/0016219 A1 | 1/2006 | Pitbladdo | |
| 2008/0148780 A1 * | 6/2008 | Berndhaeuser | C03B 5/1875 |
| | | | 65/135.4 |
| 2009/0038342 A1 * | 2/2009 | Pitbladdo | C03B 17/064 |
| | | | 65/27 |
| 2011/0032791 A1 * | 2/2011 | Singer | B01F 7/00125 |
| | | | 366/307 |
| 2011/0126592 A1 * | 6/2011 | De Angelis | C03B 5/245 |
| | | | 65/90 |
| 2011/0209502 A1 * | 9/2011 | El Kahlout | C03B 17/067 |
| | | | 65/90 |
| 2012/0006057 A1 | 1/2012 | Pitbladdo | |
| 2012/0180529 A1 * | 7/2012 | Singer | B01F 7/00425 |
| | | | 65/135.3 |
| 2012/0318020 A1 * | 12/2012 | Delia | C03B 17/067 |
| | | | 65/29.19 |
| 2013/0067958 A1 * | 3/2013 | Kariya | C03B 17/064 |
| | | | 65/53 |
| 2013/0074549 A1 * | 3/2013 | Ahrens | C03B 17/064 |
| | | | 65/29.21 |
| 2013/0118206 A1 * | 5/2013 | Maeda | C03B 17/067 |
| | | | 65/91 |
| 2014/0083138 A1 * | 3/2014 | Kogge | C03B 17/068 |
| | | | 65/29.11 |
| 2014/0238077 A1 * | 8/2014 | Anderson | C03B 17/067 |
| | | | 65/29.11 |
| 2016/0347638 A1 * | 12/2016 | Shinohara | C03B 5/187 |
| 2018/0134605 A1 * | 5/2018 | Aburada | C03B 33/0235 |
| 2018/0273416 A1 * | 9/2018 | Demirbas | C03B 5/04 |
| 2019/0292084 A1 * | 9/2019 | Ueta | C03B 5/187 |
| 2020/0270161 A1 * | 8/2020 | Delia | C03B 17/064 |
| 2020/0299173 A1 * | 9/2020 | Coppola | C03B 17/064 |
| 2021/0053857 A1 * | 2/2021 | Fraley | C03B 5/027 |
| 2021/0061694 A1 * | 3/2021 | Moon | C03B 5/23 |
| 2021/0078900 A1 * | 3/2021 | Feng | C03C 23/006 |
| 2021/0130213 A1 * | 5/2021 | Adkins | C03B 5/16 |
| 2021/0139364 A1 * | 5/2021 | Yuhara | C03B 33/0215 |
| 2021/0163332 A1 * | 6/2021 | Amosov | C03B 17/064 |
| 2021/0163334 A1 * | 6/2021 | Brown | C03B 33/0215 |

FOREIGN PATENT DOCUMENTS

| | | | | |
|---|---|---|---|---|
| CN | 103922567 A | | 7/2014 | |
| CN | 104470862 A | | 3/2015 | |
| CN | 105163949 A | | 12/2015 | |
| CN | 105431386 A | | 3/2016 | |
| GB | 1493689 A | | 11/1977 | |
| JP | 08048528 A | * | 2/1996 | C03B 5/187 |
| JP | 8048528 A | | 2/1996 | |
| JP | 8091849 A | | 4/1996 | |
| JP | 5820039 B2 | | 11/2015 | |
| TW | 201233644 A | | 8/2012 | |
| TW | I453171 B | | 9/2014 | |
| WO | 99/01741 A1 | | 1/1999 | |
| WO | 2014/104190 A1 | | 7/2014 | |
| WO | 2014134108 A1 | | 9/2014 | |

OTHER PUBLICATIONS

Extended European Search Report and Search Opinion; 20183967.7; dated Nov. 3, 2020; 10 pages; European Patent Office.

Japanese Patent Application No. 2019-510618, Office Action dated Jun. 25, 2021, 6 pages (3 pages of English Translation and 3 pages of Original Document), Japanese Patent Office.

International Search Report and Written Opinion of the International Searching Authority; PCT/US2017/047232; dated Nov. 24, 2017; 9 Pages; Korean Intellectual Property Office.

European Patent Application No. 17844152.3 Office Action dated Jul. 2, 2020; 11 Pages; European Patent Office.

Taiwanese Patent Application No. 106128201, Office Action dated Mar. 18, 2021, 3 page (English Translation Only); Taiwanese Patent Office.

Chinese Patent Application No. 201780052195.6, Office Action dated Jun. 30, 2021, 9 pages (4 pages of English Translation and 5 pages of Original Document), Chinese Patent Office.

* cited by examiner

GLASS MANUFACTURING APPARATUS AND METHODS

CROSS-REFERENCE TO RELATED APPLICATIONS

The application claims the benefit of priority under 35 U.S.C. § 371 of International Application No. PCT/US17/47232, filed on Aug. 16, 2017, which claims the benefit of priority of U.S. Provisional Application Ser. No. 62/378,950 filed on Aug. 24, 2016 the contents of which are relied upon and incorporated herein by reference in their entirety as if fully set forth below.

FIELD

The present disclosure relates generally to methods and apparatus for controlling a flowrate of molten material, and more particularly, to methods and apparatus for controlling a flowrate of molten material at a downstream location in a glass manufacturing apparatus including a glass manufacturing process.

BACKGROUND

It is known to manufacture glass in a glass manufacturing apparatus including a glass manufacturing process. It is also known to control a flowrate of molten material in a glass manufacturing process.

SUMMARY

The following presents a simplified summary of the disclosure in order to provide a basic understanding of some exemplary embodiments described in the detailed description.

In some embodiments, a method of controlling a flowrate of molten material at a downstream location in a glass manufacturing process can include mixing the molten material at an upstream location positioned upstream from the downstream location relative to a flow direction of the molten material with a shaft including a plurality of protrusions. The method can include measuring a torque of the shaft, measuring a level of the molten material at the upstream location, and calculating a viscosity of the molten material at the upstream location based on the measured torque and the measured level. The method can include estimating the flowrate based on the calculated viscosity, and controlling the flowrate at the downstream location based on the estimated flowrate.

In some embodiments, controlling the flowrate can include comparing the estimated flowrate to a predetermined flowrate.

In some embodiments, controlling the flowrate can include adjusting a temperature of the molten material at a midstream location positioned between the upstream location and the downstream location based on the estimated flowrate.

In some embodiments, adjusting the temperature of the molten material at the midstream location can adjust the flowrate of the molten material at the downstream location.

In some embodiments, adjusting the temperature of the molten material at the midstream location can provide an adjusted flowrate of the molten material at the downstream location, and the method can include forming a glass ribbon from the molten material at the adjusted flowrate.

In some embodiments, measuring the level of the molten material can include measuring a height of the molten material relative to a length of the shaft.

In some embodiments, measuring the torque of the shaft can include rotating a rotor mounted to the shaft relative to a stator. In some embodiments, the stator can be positioned to receive a signal from the rotor without physically contacting the rotor.

In some embodiments, the rotor can be mounted to the shaft between two electrically nonconductive connectors.

In some embodiments, the rotor can be mounted to the shaft with a double-flex coupler positioned between the rotor and the plurality of protrusions.

In some embodiments, a method of controlling a flowrate of molten material at a downstream location in a glass manufacturing process can include forming a glass ribbon from the molten material at the flowrate and calculating the flowrate of the molten material from which the glass ribbon was formed. The method can include calculating a viscosity of the molten material at an upstream location positioned upstream from the downstream location relative to a flow direction of the molten material. The method can include estimating the flowrate based on the calculated viscosity and the calculated flowrate and controlling the flowrate of the molten material at the downstream location based on the estimated flowrate.

In some embodiments, calculating the flowrate of the molten material from which the glass ribbon was formed can include separating a glass sheet from the glass ribbon and measuring a weight of the glass sheet.

In some embodiments, estimating the flowrate can include estimating a first flowrate based on the calculated viscosity and estimating a second flowrate based on the calculated flowrate. In some embodiments, controlling the flowrate can include comparing the first estimated flowrate and the second estimated flowrate to a predetermined flowrate.

In some embodiments, controlling the flowrate can include adjusting a temperature of the molten material at a midstream location positioned between the upstream location and the downstream location based on the first estimated flowrate and the second estimated flowrate.

In some embodiments, adjusting the temperature of the molten material at the midstream location can include a first temperature adjustment based on the first estimated flowrate and a second temperature adjustment based on the second estimated flowrate In some embodiments, the first temperature adjustment and the second temperature adjustment can be performed at different times during the glass manufacturing process.

In some embodiments, the first temperature adjustment and the second temperature adjustment can adjust the flowrate of the molten material at the downstream location.

In some embodiments, the first temperature adjustment and the second temperature adjustment can provide an adjusted flowrate of the molten material at the downstream location, and the method can include forming a glass ribbon from the molten material at the adjusted flowrate.

In some embodiments, the method can include mixing the molten material at the upstream location with a shaft comprising a plurality of protrusions. The method can include measuring a torque of the shaft, measuring a level of the molten material at the upstream location, and calculating the viscosity of the molten material at the upstream location based on the measured torque and the measured level.

In some embodiments, measuring the level of the molten material can include measuring a height of the molten material relative to a length of the shaft.

In some embodiments, measuring the torque of the shaft can include rotating a rotor mounted to the shaft relative to a stator. In some embodiments, the stator can be positioned to receive a signal from the rotor without physically contacting the rotor.

The above embodiments are exemplary and can be provided alone or in any combination with any one or more embodiments provided herein without departing from the scope of the disclosure. Moreover, it is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

BRIEF DESCRIPTION OF THE DRAWINGS

These and other features, embodiments, and advantages of the present disclosure can be further understood when read with reference to the accompanying drawings.

DETAILED DESCRIPTION

Methods will now be described more fully hereinafter with reference to the accompanying drawings in which exemplary embodiments of the disclosure are shown. Whenever possible, the same reference numerals are used throughout the drawings to refer to the same or like parts. However, this disclosure may be embodied in many different forms and should not be construed as limited to the embodiments set forth herein.

Glass sheets are commonly fabricated by flowing molten material to a forming body whereby a glass ribbon may be formed by a variety of ribbon forming processes including, float, slot draw, down-draw, fusion down-draw, up-draw, press roll or any other forming processes. The glass ribbon from any of these processes may then be subsequently divided to provide one or more glass sheets suitable for further processing into a desired application, including but not limited to, a display application, a lighting application, a photovoltaic application or any other application benefiting from the use of high quality glass sheets. For example, the one or more glass sheets can be used in a variety of display applications, including liquid crystal displays (LCDs), electrophoretic displays (EPD), organic light emitting diode displays (OLEDs), plasma display panels (PDPs), or the like.

Figure 1:
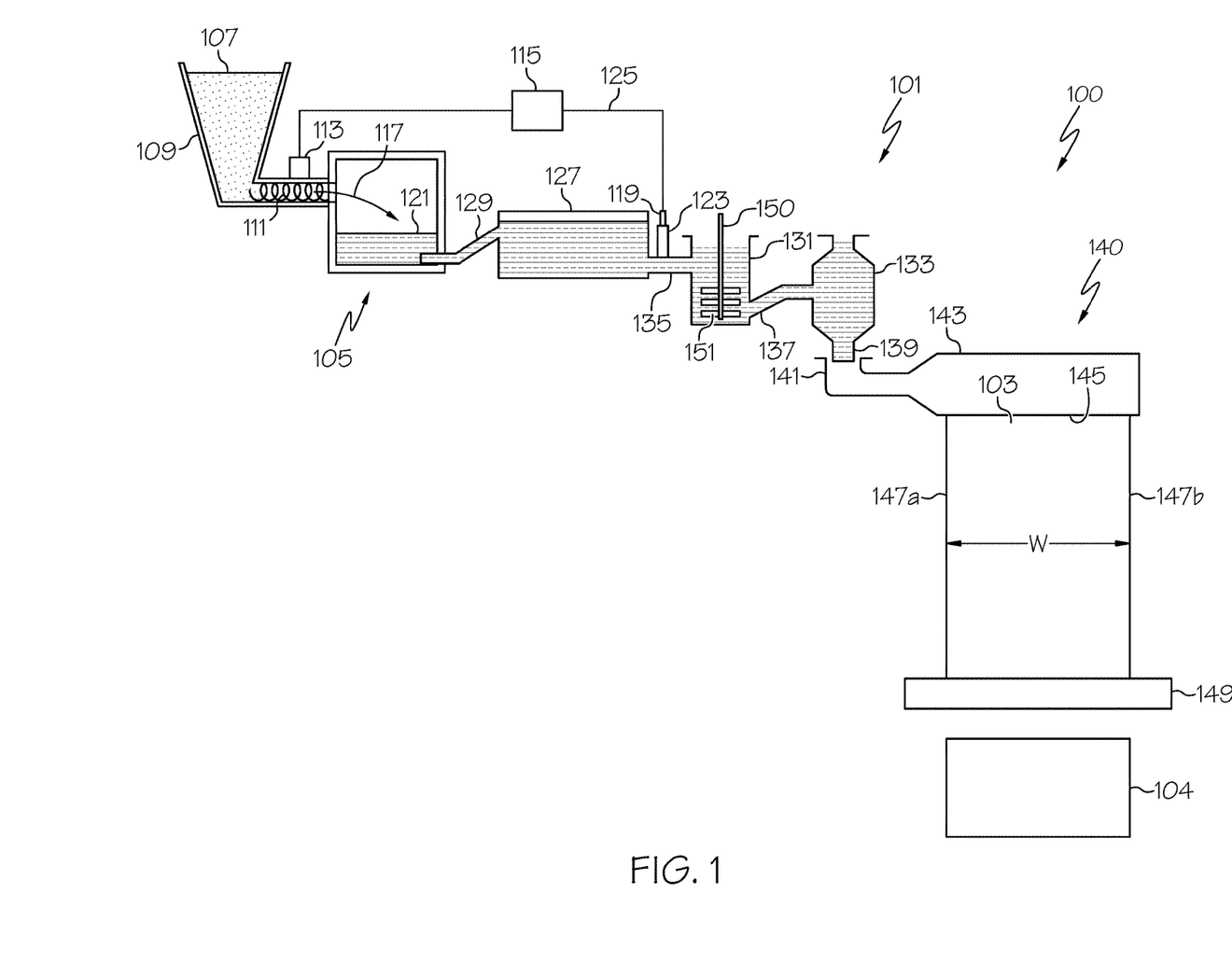
FIG. 1 illustrates a schematic view of an exemplary glass manufacturing apparatus in accordance with embodiments disclosed herein.

FIG. 1 schematically illustrates an exemplary glass manufacturing apparatus 101 to process, manufacture, and form a glass ribbon 103. The glass manufacturing apparatus 101 can operate to provide a glass manufacturing process 100 that can, in some embodiments, include any one or more of the features of the glass manufacturing apparatus 101 disclosed herein. For illustration purposes, the glass manufacturing apparatus 101 and the glass manufacturing process 100 are illustrated as a fusion down-draw apparatus and process, although other glass manufacturing apparatus and/ or glass manufacturing processes including up-draw, float, press rolling, slot draw, etc. may be provided in some embodiments. As illustrated, the glass manufacturing apparatus 101 can include a melting vessel 105 oriented to receive batch material 107 from a storage bin 109. The batch material 107 can be introduced by a batch delivery device 111 powered by a motor 113. An optional controller 115 can be operated to activate the motor 113 such that the batch delivery device 111 can introduce a desired amount of batch material 107 into the melting vessel 105, as indicated by arrow 117. A glass melt probe 119 can be used to measure a level of molten material 121 within a standpipe 123 and communicate the measured information to the controller 115 by way of a communication line 125.

The glass manufacturing apparatus 101 can also include a fining vessel 127 located downstream from the melting vessel 105 relative to a flow direction of the molten material 121 and coupled to the melting vessel 105 by way of a first connecting conduit 129. In some embodiments, molten material 121 may be gravity fed from the melting vessel 105 to the fining vessel 127 by way of the first connecting conduit 129. For example, gravity may drive the molten material 121 through an interior pathway of the first connecting conduit 129 from the melting vessel 105 to the fining vessel 127. Within the fining vessel 127, bubbles may be removed from the molten material 121 by various techniques.

The glass manufacturing apparatus 101 can further include a mixing chamber 131 that may be located downstream from the fining vessel 127 relative to a flow direction of the molten material 121. In some embodiments, the mixing chamber 131 can include a shaft 150 including a plurality of protrusions 151 (e.g., stir blades) to mix molten material 121 within the mixing chamber 131. The mixing chamber 131 can be used to provide a homogenous composition of molten material 121, thereby reducing or eliminating inhomogeneity that may otherwise exist within the molten material 121 exiting the fining vessel 127. As shown, the fining vessel 127 may be coupled to the mixing chamber 131 by way of a second connecting conduit 135. In some embodiments, molten material 121 may be gravity fed from the fining vessel 127 to the mixing chamber 131 by way of the second connecting conduit 135. For instance, gravity may drive the molten material 121 through an interior pathway of the second connecting conduit 135 from the fining vessel 127 to the mixing chamber 131.

The glass manufacturing apparatus 101 can further include a delivery vessel 133 that may be located downstream from the mixing chamber 131 relative to a flow direction of the molten material 121. The delivery vessel 133 can condition the molten material 121 to be fed into a glass former 140. For example, the delivery vessel 133 can function as an accumulator and/or flow controller to adjust and provide a consistent flow of molten material 121 to the glass former 140. As shown, the mixing chamber 131 may be coupled to the delivery vessel 133 by way of a third connecting conduit 137. In some embodiments, molten material 121 may be gravity fed from the mixing chamber 131 to the delivery vessel 133 by way of the third connecting conduit 137. For instance, gravity may drive the molten material 121 through an interior pathway of the third connecting conduit 137 from the mixing chamber 131 to the delivery vessel 133.

As further illustrated, a delivery pipe 139 can be positioned to deliver molten material 121 to the glass former 140 of the glass manufacturing apparatus 101. The glass former 140 may draw the molten material 121 into the glass ribbon 103 from a bottom edge (e.g., root 145) of a forming vessel 143. In the illustrated embodiment, the forming vessel 143 can be provided with an inlet 141 oriented to receive molten material 121 from the delivery pipe 139 of the delivery vessel 133. In some embodiments, the forming vessel 143 can include a trough oriented to receive the molten material 121 from the inlet 141. The forming vessel 143 can further include a forming wedge including a pair of downwardly inclined converging surface portions extending between opposed ends of the forming wedge and join at the root 145. In some embodiments, the molten material 121 can flow from the inlet 141 into the trough of the forming vessel 143. The molten material 121 can then overflow from the trough by simultaneously flowing over corresponding weirs and downward over the outer surfaces of the corresponding weirs. Respective streams of molten material 121 then flow along the downwardly inclined converging surface portions of the forming wedge to be drawn off the root 145 of the forming vessel 143, where the flows converge and fuse into the glass ribbon 103. The glass ribbon 103 may then be fusion drawn off the root 145 with a width "W" of the glass ribbon 103 extending between a first vertical edge 147a of the glass ribbon 103 and a second vertical edge 147b of the glass ribbon 103.

In some embodiments, a thickness of the glass ribbon 103 defined between a first major surface and an opposing second major surface of the glass ribbon 103 can be, for example, from about 40 micrometers (μm) to about 3 millimeters (mm), for example, from about 40 micrometers to about 2 millimeters, for example, from about 40 micrometers to about 1 millimeter, for example, from about 40 micrometers to about to about 0.5 millimeters, for example, from about 40 micrometers to about 400 micrometers, for example, from about 40 micrometers to about 300 micrometers, for example, from about 40 micrometers to about 200 micrometers, for example, from about 40 micrometers to about 100 micrometers, or, for example, about 40 micrometers, although other thicknesses may be provided in further embodiments. In addition, the glass ribbon 103 can include a variety of compositions including but not limited to glass, ceramic, glass-ceramic, soda-lime glass, borosilicate glass, alumino-borosilicate glass, an alkali-containing glass, an alkali-free glass, or any combination thereof.

In some embodiments, the glass manufacturing apparatus 101 can include a glass separator 149. As shown, the glass separator 149 can be positioned downstream from the glass former 140 and oriented to separate the glass sheet 104 from the glass ribbon 103. A variety of glass separators 149 may be provided in embodiments of the present disclosure. For example, a traveling anvil machine may be provided that can score and then break the glass ribbon 103 along the score line. In some embodiments, the glass separator 149 can include a laser, a scribe, a tool, a robot, etc. that can operate to separate the glass sheet 104 from the glass ribbon 103 along a separation path parallel to the width "W" of the glass ribbon 103 between the first vertical edge 147a of the glass ribbon 103 and the second vertical edge 147b of the glass ribbon 103.

Figure 2:
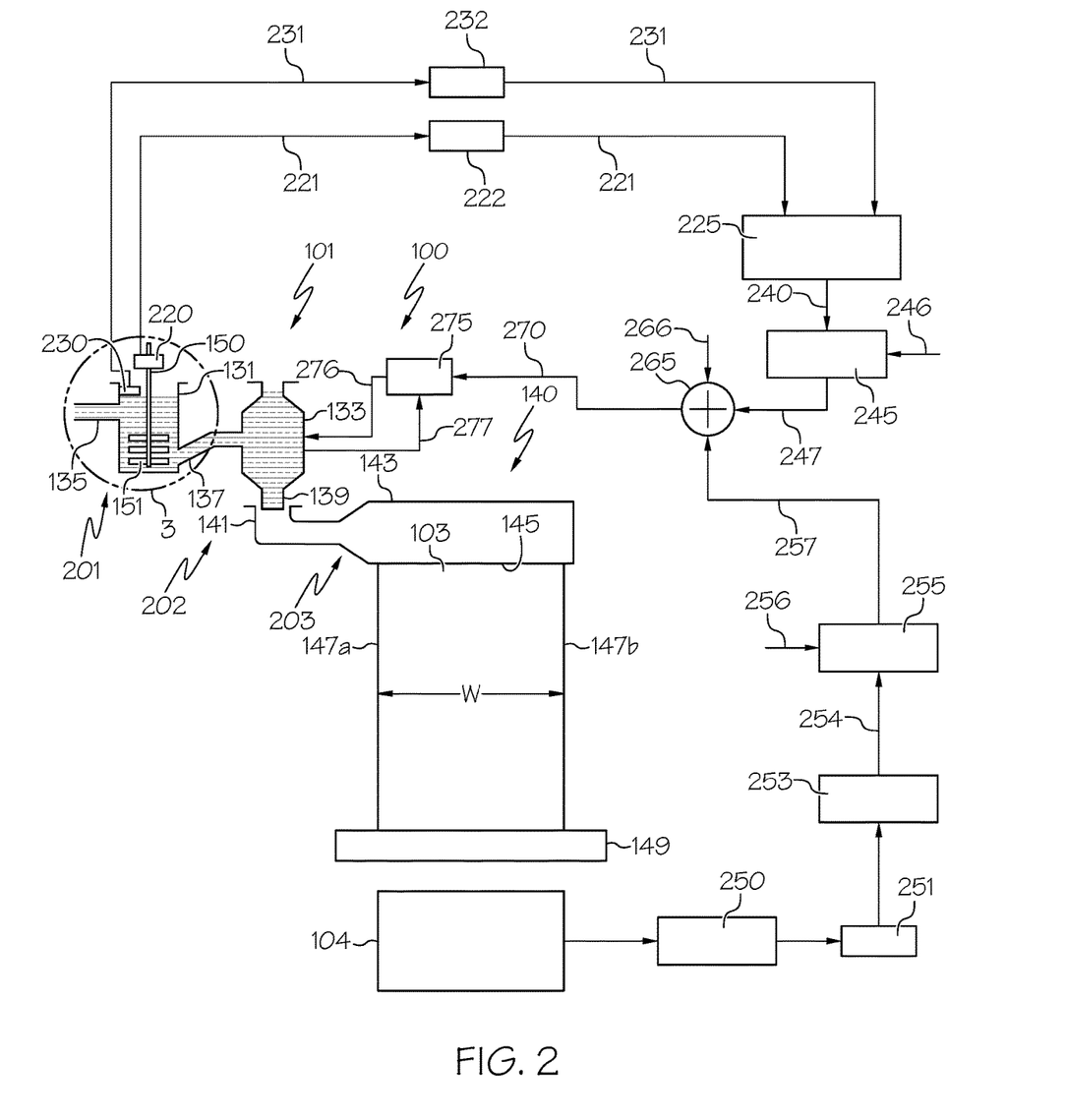
FIG. 2 shows a schematic view of a representative portion of the glass manufacturing apparatus of FIG. 1 including a method of controlling a flowrate of molten material.

As illustrated in FIG. 2, for purposes of this disclosure, an upstream location 201, a midstream location 202, and a downstream location 203 are used to identify various regions of the glass manufacturing apparatus 101 relative to a flow direction of the molten material 121. The upstream location 201, the midstream location 202, and the downstream location 203 can include corresponding components of the glass manufacturing apparatus 101 that can be positioned at a particular region as well as corresponding processes of the glass manufacturing process 100 that can occur at that particular region. Illustration of a relative spatial location of the upstream location 201, the midstream location 202, and the downstream location 203, is for pictorial representation and, unless otherwise noted, is not intended to impart limitation of a spatial position of the location. Accordingly, the terms upstream, midstream, and downstream should be interpreted relative to a process location in the glass manufacturing process 100 as the molten material 121 moves through the glass manufacturing apparatus 101 from the upstream location 201, to the midstream location 202, and to the downstream location 203. That is, the downstream location 203 is positioned downstream of the upstream location 201 relative to a flow direction of the molten material 121, and the midstream location 202 is positioned between the upstream location 201 and the downstream location 203 relative to the flow direction of the molten material 121.

Thus, it is to be understood that any one or more processes at the upstream location 201 can occur prior to any one or more processes at the midstream location 202 and prior to any one or more processes at the downstream location 203. Likewise, any one or more processes at the downstream location 203 can occur after any one or more processes at the upstream location 201 and after any one or more processes at the midstream. Similarly, any one or more processes at the midstream location 202 can occur after any one or more processes at the upstream location 201 and before any one or more processes at the downstream location 203.

In some embodiments, the glass ribbon 103 can be formed at a rate corresponding to a mass or weight of glass formed per unit time, representing the flowrate of the molten material 121 at the downstream location 203 in the glass manufacturing process 100. For example, in some embodiments, the flowrate of the molten material 121 flowing from the glass former 140 (e.g., flowing off of the root 145 of the forming vessel 143) and being formed into the glass ribbon 103 can define the flowrate of molten material 121 at the downstream location 203 in the glass manufacturing process 100. In some embodiments, one or more factors may contribute to the flowrate of the molten material 121 at the downstream location 203. For example, the flowrate of the molten material 121 at the downstream location 203 can be based at least in part on a viscosity of the molten material 121. In addition, the viscosity of the molten material 121 can be based at least in part on the temperature of the molten material 121 as well as a material composition of the molten material 121. In some embodiments, less viscous molten material 121 can provide a higher flowrate of molten material 121 at the downstream location 203 than, for example, more viscous molten material 121, which can provide a comparatively lower flowrate of molten material 121 at the downstream location 203. Accordingly, by controlling the viscosity of the molten material 121, the features of the present disclosure can control the flowrate of the molten material 121 at the downstream location 203.

In some embodiments, controlling the flowrate of molten material 121 at the downstream location 203 in the glass manufacturing process 100 can control characteristics of the glass ribbon 103. For example, controlling the flowrate of molten material 121 at the downstream location 203 can control any one or more of a thickness of the glass ribbon 103, a width "W" of the glass ribbon 103, a variation in thickness across the width "W" of the glass ribbon 103, a temperature of the glass ribbon 103, a stress in the glass ribbon 103, an optical quality of the glass ribbon 103, as well as other parameters and attributes of the glass ribbon 103. In some embodiments, a consistent (e.g., constant) flowrate of molten material 121 at the downstream location 203 over a period of time can provide a glass ribbon 103 having a uniform thickness that includes less stress concentrations than, for example, a glass ribbon 103 formed with molten material 121 flowing at an inconsistent (e.g., fluctuating, changing) flowrate over the same period of time. Accordingly, in some embodiments, changes in flowrate of molten material 121 at the downstream location 203 can impact quality characteristics of the glass ribbon 103, and controlling the flowrate of molten material 121 at the downstream location 203 can reduce undesirable characteristics of the glass ribbon 103 and improve the quality of the glass ribbon 103.

Moreover, it has been observed that variability of the flowrate of the molten material 121 can increase as the flowrate itself increases. That is, for comparatively lower flowrates, the variability of the flowrate has been observed to be less; whereas, for comparatively higher flowrates, the variability of the flowrate has been observed to be greater. Thus, because greater variability of the flowrate of the molten material 121 at the downstream location 203 can cause greater variability of any one or more of a thickness of the glass ribbon 103, a width "W" of the glass ribbon 103, a variation in thickness across the width "W" of the glass ribbon 103, a temperature of the glass ribbon 103, a stress in the glass ribbon 103, an optical quality of the glass ribbon 103, as well as other parameters and attributes of the glass ribbon 103, higher flowrates can exacerbate this correlation and, without the control provided for herein, can result in increasingly poorer quality glass ribbon 103. Accordingly, in addition to improving the quality of the glass ribbon 103 produced at the flowrate, the features of the present disclosure can also be employed in a glass manufacturing apparatus 101 to provide higher (e.g., increased) flowrates of the glass manufacturing process 100. Increased flowrates can result in higher output of glass ribbon 103 over a comparable time, thus decreasing costs and improving process efficiency.

Figure 3:
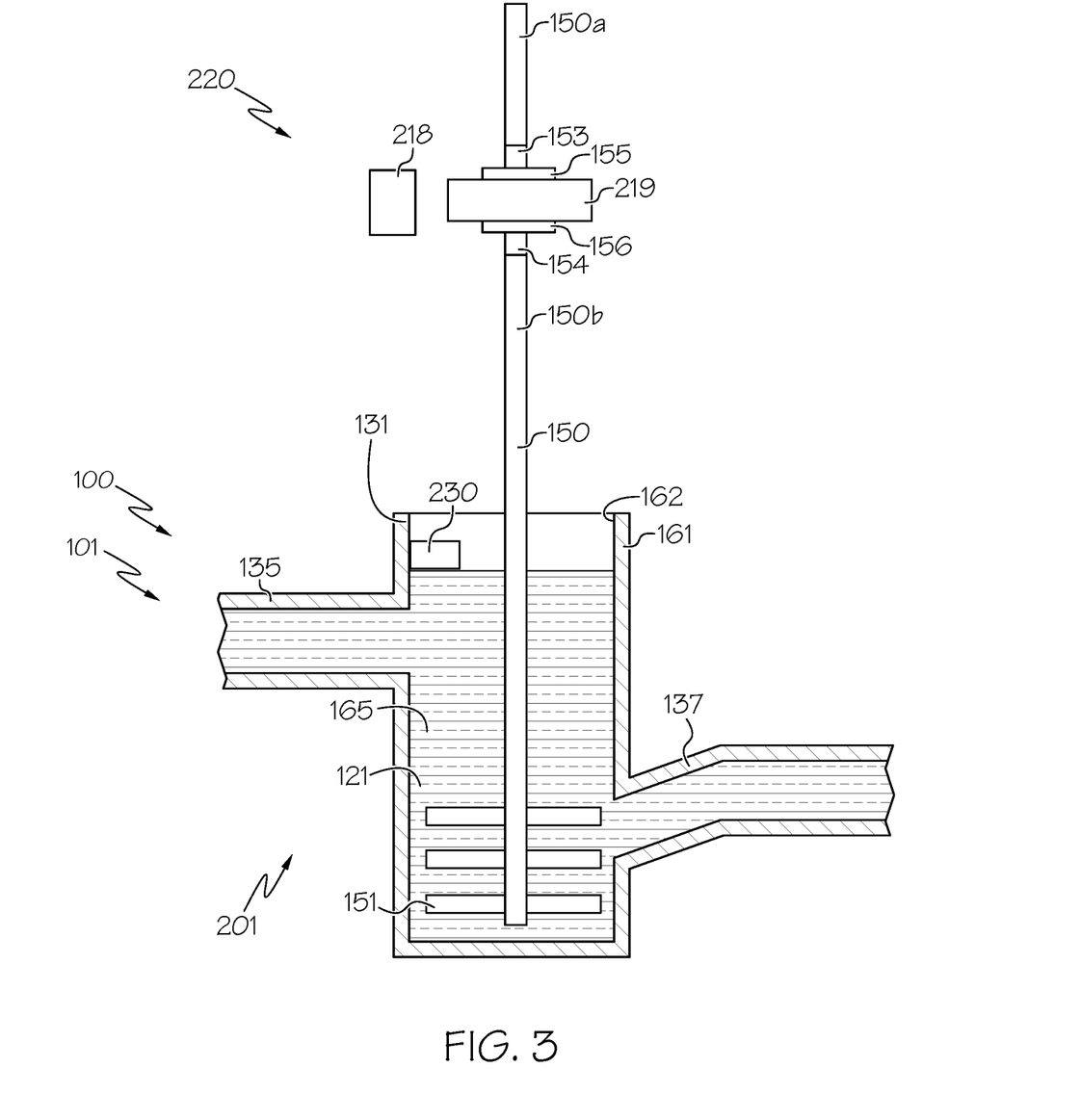
FIG. 3 shows a schematic view of a region of the glass manufacturing apparatus identified by numeral 3 of FIG. 2 including an exemplary torque sensor.

In some embodiments, a method of controlling a flowrate of molten material 121 at the downstream location 203 in a glass manufacturing process 100 can include mixing the molten material 121 at the upstream location 201 (e.g., in the mixing chamber 131) positioned upstream from the downstream location 203 with a shaft 150 including a plurality of protrusions 151. For example, FIG. 3 schematically illustrates a portion of the upstream location 201 of the glass manufacturing apparatus 101 identified by numeral 3 in FIG. 2 including the mixing chamber 131. As shown, the glass manufacturing apparatus 101 can include an exemplary torque sensor 220 and an exemplary level sensor 230. The torque sensor 220 can include a rotor 219 and a stator 218, where the rotor 219 can be configured to move relative to the stator 218. The relative movement of the rotor 219 with respect to the stator 218 can define a torque 221 on the shaft 150, which the torque sensor 220 can communicate to any one or more controllers and control devices (e.g., programmable logic controller) configured to (e.g., "programmed to", "encoded to", "designed to", and/or "made to") operate to perform any one or more methods of the present disclosure.

In some embodiments, the torque sensor 220 can be a wireless torque sensor 220 where the rotor 219 and the stator 218 can communicate with each other wirelessly (e.g., without being in physical contact) with each other. For example, in some embodiments, the rotor 219 can include an antenna oriented to wirelessly communicate a signal to the stator 218, and the stator 218 can include a receiver oriented to wirelessly receive the signal from the rotor 219. In some embodiments, the wireless torque sensor 220 can provide higher accuracy signal acquisition of the torque 221 on the shaft 150 as compared to, for example, other torque sensors including inline torque sensors which can, in some embodiments, include mechanical components that are connected to the shaft 150 and in physical contact with each other. Physical contact between the mechanical components of other non-wireless torque sensors can produce friction and can therefore reduce the accuracy and refinement capabilities of the torque sensor to measure the torque on the shaft 150. However, because the rotor 219 and stator 218 of a wireless torque sensor 220 are not in physical contact with each other, the wireless torque sensor 220 does not have friction between moving parts. Accordingly, because the effect of friction can be removed when employing the wireless torque sensor 220, more accurate torque measurements with higher levels of refinement can therefore be obtained.

Additionally, in some embodiments, the wireless torque sensor 220 can provide higher signal accuracy and more refined signal resolution, corresponding to detection of comparatively higher accuracy and more refined torque measurements. Thus, as compared to an inline torque sensor, the wireless torque sensor 220 can detect smaller variations in torque with higher accuracy. The detected smaller variations in torque can be employed to calculate a correspondingly higher accuracy viscosity determination of the molten material 121, which can likewise be employed to control the flowrate of the molten material 121 at the downstream location 203 with correspondingly higher accuracy. In some embodiments, the rotor 219 can include a thermocouple to measure a temperature of the rotor 219 to, for example, ensure that a maximum operating temperature of the torque sensor 220 is not exceeded. In some embodiments, the stator 218 can include a signal quality detector that can measure a quality of the signal communicated from the rotor 219 to the stator 218 to, for example, ensure that a strong, uninterrupted signal (representing an accurate torque measurement) is communicated from the rotor 219 to the stator 218. As noted, controlling the flowrate of molten material 121 at the downstream location 203 can reduce undesirable characteristics of the glass ribbon 103 and improve the quality of the glass ribbon 103.

As shown in FIG. 3, in some embodiments, the mixing chamber 131 can include a wall 161 with an inner surface 162 defining a molten material containment area 165. In some embodiments, the shaft 150 can extend into the molten material containment area 165 of the mixing chamber 131 and the plurality of protrusions 151 can be positioned in the molten material 121 within the molten material containment area 165. By moving the shaft 150, the plurality of protrusions 151 can correspondingly move and mix the molten material 121 within the mixing chamber 131. For example, in some embodiments, the shaft 150 can include an upper shaft 150a and a lower shaft 150b. The upper shaft 150a can be driven (e.g., rotated, agitated) by a motor, actuator, or other device (not shown) and can transfer the movement from the upper shaft 150*a* to the lower shaft 150*b* to move the plurality of protrusions 151 within the molten material 121. In some embodiments, the upper shaft 150*a* can be connected to the lower shaft 150*b* with a mechanical connection including an upper coupler 153 that can couple the upper shaft 150*a* and a lower coupler 154 that can couple the lower shaft 150*b*. In some embodiments, the upper coupler 153 can couple the upper shaft 150*a* to the rotor 219 of the torque sensor 220 and the lower coupler 154 can couple the lower shaft 150*b* to the rotor 219. Accordingly, when the upper shaft 150*a* is driven (e.g., rotated), the rotor 219 and the lower shaft 150*b* can likewise rotate.

In some embodiments, an upper electrically nonconductive connector 155 can be positioned between the upper shaft 150*a* and the rotor 219, between the upper coupler 153 and the rotor 219, and/or between the upper coupler 153 and the upper shaft 150*a* to electrically isolate the rotor 219 from electrical signals and interference that may transfer to the rotor 219 from the upper shaft 150*a*. Similarly, a lower electrically nonconductive connector 156 can be positioned between the lower shaft 150*b* including the plurality of protrusion and the rotor 219, between the lower coupler 154 and the rotor 219, and/or between the lower coupler 154 and the lower shaft 150*b* to electrically isolate the rotor 219 from electrical signals and interference that may transfer to the rotor 219 from the lower shaft 150*b*.

By positioning the rotor 219 of the torque sensor 220 on the shaft 150 between the upper electrically nonconductive connector 155 and the lower electrically nonconductive connector 156, the rotor 219 can be electrically isolated from electrical signals and interference. For example, electrical components of the glass manufacturing apparatus 101 and other electrical components positioned at a location within which an electrical signal from the electrical component can interact with the rotor 219 may interfere with the operation of the torque sensor 220, degrading the communication signal between the rotor 219 and the stator 218 and/or reducing the accuracy of the torque 221 measurement of the torque sensor 220. Accordingly, positioning the rotor 219 of the torque sensor 220 on the shaft 150 between the upper electrically nonconductive connector 155 and the lower electrically nonconductive connector 156 can provide more accurate and reliable torque measurement which can, in turn, provide more accurate and reliable calculations of the viscosity of the molten material 121.

In some embodiments, mechanical vibrations and other movement of the lower shaft 150*b*, for example, while moving within the molten material 121, can cause misalignment between the rotor 219 and the stator 218. Misalignment between the rotor 219 and the stator 218 can decrease the strength of the communication signal between the rotor 219 and the stator 218 and can also result in less accurate torque measurement. Accordingly, in some embodiments, the lower coupler 154 can include a double-flex coupler that can compensate for misalignment between the lower shaft 150*b* and the rotor 219. For example, the double-flex coupler can include a coupler having two degrees of freedom including a first axial degree of freedom that can reduce displacement of the rotor 219 in an axial direction along the axis of the shaft 150 as well as a second radial degree of freedom to reduce displacement in a radial direction that is perpendicular to the axial direction. In some embodiments, the double-flex coupler can reduce and/or eliminate transfer of mechanical vibrations and other movement of the lower shaft 150*b* to the rotor 219, thus improving the communication signal strength between the rotor 219 and the stator 218 as well as improving the accuracy of the torque measurement.

In some embodiments, a level 231 of the molten material 121 in the mixing chamber 131, for example, can define at least in part the torque 221 on the shaft 150. That is, because the torque 221 on the shaft 150 can represent a turning force on the shaft 150 that causes the shaft 150 to rotate, the torque 221 can change relative to a change in the level 231 of the molten material 121 in which the shaft 150 and the plurality of protrusions 151 are rotating. Accordingly, by measuring both the torque 221 on the shaft 150 and the level 231 of the molten material 121, a more accurate calculation of the viscosity of the molten material 121 can be determined, and a correspondingly more accurate control of the flowrate of the molten material 121 at the downstream location 203 can be provided. In some embodiments, the level sensor 230 can include any one or more of a probe, an optical sensor, an electrical sensor, and any other sensor to measure a level 231 of the molten material 121 relative to a length of the shaft 150 within the molten material containment area 165 of the mixing chamber 131.

Although not shown, in some embodiments, the top of the molten material containment area 165 may be capped with a lid to seal the molten material containment area 165. Likewise, in some embodiments, the mixing chamber 131 can be positioned within a housing (not shown) to provide a controlled atmosphere and to protect the mixing chamber 131 from external disturbances. In some embodiments, the second connecting conduit 135 can provide molten material 121 from the second connecting conduit 135 to the mixing chamber 131, and the third connecting conduit 137 can provide molten material 121 from the mixing chamber 131 to the third connecting conduit 137. In some embodiments, the glass manufacturing apparatus 101 can operate to provide a glass manufacturing process 100 that can include flowing molten material 121 through the molten material containment area 165 of the mixing chamber 131, and mixing the molten material 121 as the molten material 121 flows through the molten material containment area 165 of the mixing chamber 131. For example, the shaft 150 and the plurality of protrusions 151 can move (e.g., rotate) within the molten material containment area 165 of the mixing chamber 131 to mix the molten material 121. While the molten material 121 is being mixed, the torque sensor 220 can measure the torque 221 on the shaft 150, with the understanding that a higher measured torque can correspond to molten material 121 having a higher viscosity as compared to a lower measured torque which can correspond to molten material 121 having a comparatively lower viscosity.

Additionally, in some embodiments, the molten material containment area 165 can define any one or more of a container in which molten material 121 can be held in either a stationary or non-stationary state, a passage through which molten material 121 can flow (e.g., without additional processing of the molten material 121), and a container or passage in which additional processing of and interaction with the molten material 121 can occur (e.g., mixing, heating, cooling, etc.). In some embodiments, the molten material containment area 165 can include a free surface of molten material 121 where a portion of an interior region of the mixing chamber 131 may not be occupied by the molten material 121. Alternatively, the interior region of the mixing chamber 131 can be entirely occupied with molten material 121, in some embodiments, and the molten material containment area 165 can abut molten material 121 around an entire periphery of the molten material containment area 165. Thus, although disclosed herein with respect to the mixing chamber 131 of the glass manufacturing apparatus 101, it is to be understood that the methods and apparatus of the present disclosure can be employed to measure a viscosity of molten material 121 at any one or more locations within the glass manufacturing apparatus 101 and the glass manufacturing process 100. Likewise, although disclosed herein as controlling a flowrate of the molten material 121 at the downstream location 203, it is to be understood that the methods and apparatus of the present disclosure can be employed to control the flowrate of molten material 121 at any one or more locations within the glass manufacturing apparatus 101 and the glass manufacturing process 100.

Referring back to FIG. 2, the method of controlling the flowrate of the molten material 121 at the downstream location 203 can include measuring the torque 221 of the shaft 150 and measuring a level 231 of the molten material 121 at the upstream location 201. For example, the torque sensor 220 can measure the torque 221 on the shaft 150, and the level sensor 230 can measure the level 231 of the molten material 121 within the mixing chamber 131 at the upstream location 201. In some embodiments, the measured torque 221 can be processed through an optional filter 222 to remove noise, harmonics, and other electrical interference before being provided to a flowrate estimator 225. Similarly, the measured level 231 can be processed through an optional filter 232 to remove noise, harmonics, and other electrical interference before being provided to the flowrate estimator 225. The flowrate estimator 225 can calculate the viscosity of the molten material 121 at the upstream location 201 based on the measured torque 221 and the measured level 231 of the molten material 121. The flowrate estimator 225 can then estimate the flowrate (represented by arrow 240) of the molten material 121 at the downstream location 203 based on the calculated viscosity. In some embodiments, the estimated flowrate 240 can be determined with any one or more flow equations (e.g., Hagen-Poiseuille law) which correlate flow of a fluid to the viscosity of a fluid, where the viscosity can be based at least in part on the measured torque 221 and the measured level 231 of the molten material 121. In some embodiments, the estimated flowrate 240 can be determined based on experimental data, one or more transfer functions, and any other calculations that provide an estimate of flowrate of a fluid as a function of viscosity of the fluid.

It is to be understood that by providing the estimated flowrate 240 at the downstream location 203, the flowrate estimator 225 of the present disclosure is anticipatory. That is, the flowrate estimator 225 can determine, for example, what the flowrate of the molten material 121 at the downstream location 203 would be if the molten material 121 at the upstream location 201, the viscosity of which was calculated, was to continue from the upstream location 201 through the glass manufacturing process 100 (e.g., without any external intervention) to the downstream location 203. In particular, the estimated flowrate 240 is determined prior to the glass ribbon 103 being formed at the downstream location 203. Thus, the flowrate estimator 225 can estimate what the expected flowrate of molten material 121 at the downstream location 203 would be if the glass ribbon 103 was formed with the molten material 121 having the calculated viscosity and the corresponding flowrate. The anticipatory nature of the flowrate estimator 225 can therefore predict future occurrences within the glass manufacturing process 100 prior to them occurring. Accordingly, if necessary, corrective action can be taken prior to an undesirable event occurring. For example, the estimated flowrate 240 can be provided to a feed-forward control 245. The feed-forward control 245 can control the flowrate of the molten material 121 at the downstream location 203 based on the estimated flowrate 240. In some embodiments, controlling the flowrate can include comparing the estimated flowrate 240 to a first predetermined flowrate 246.

In some embodiments, the method can include forming a glass ribbon 103 from the molten material 121 at a flowrate and calculating the flowrate of the molten material 121 from which the glass ribbon 103 was formed. For example, as represented by reference numeral 250, in some embodiments, calculating the flowrate of the molten material 121 from which the glass ribbon 103 was formed can include separating a glass sheet 104 from the glass ribbon 103 and measuring a weight of the glass sheet 104. As with the measured torque 221 and the measured level 231, the measured weight 250 of the glass sheet 104 can be processed through an optional filter 251 to remove noise, harmonics, and other electrical interference before being provided to a flowrate calculator 253. The flowrate calculator 253 can calculate the flowrate (represented by arrow 254) of the molten material 121 from which the glass ribbon 103 was formed. In some embodiments, a sensor can be configured to determine the calculated flowrate 254 of the molten material 121 from which the glass ribbon 103 was formed. In some embodiments, the glass ribbon 103 can be rolled onto a spool and a subsequent weight of the spool can be measured and used by the flowrate calculator 253 to determine the calculated flowrate 254 of the molten material 121.

It is to be understood that by providing the calculated flowrate 254 at the downstream location 203, the flowrate calculator 253 of the present disclosure is reactionary. That is, the flowrate calculator 253 can determine, for example, what the actual flowrate of the molten material 121 at the downstream location 203 was, based on the properties of the glass ribbon 103 formed from the molten material 121 at that flowrate. The reactionary nature of the flowrate calculator 253 can therefore detect occurrences within the glass manufacturing process 100 after they occur. Accordingly, if necessary, corrective action can be taken only after an undesirable event has occurred. For example, the calculated flowrate 254 can be provided to a feed-back control 255. The feed-back control 255 can control the flowrate of the molten material 121 at the downstream location 203 based on the calculated flowrate 254. In some embodiments, controlling the flowrate can include comparing the calculated flowrate 254 to a second predetermined flowrate 256.

In some embodiments, the features of the anticipatory flowrate estimator 225 including the feed-forward control 245 and the reactionary second flow estimation including the feed-back control 255, can be used either alone or in combination. For example, in some embodiments, a feed-forward signal 247 from the feed-forward control 245 can be provided to a summation control 265. Similarly, in some embodiments, a feed-back signal 257 from the feed-back control 255 can be provided to the summation control 265. In some embodiments, the feed-forward signal 247 may be employed alone to control the flowrate of the molten material 121 at the downstream location 203. Additionally, in some embodiments, the feed-back signal 257 may be employed alone to control the flowrate of the molten material 121 at the downstream location 203. Moreover, in some embodiments, the feed-forward signal 247 and the feed-back signal 257 may be employed together to control the flowrate of the molten material 121 at the downstream location 203.

In some embodiments, the feed-forward signal 247 and the feed-back signal 257 may be employed any one or more times continuously in an iterative process to continuously control the flowrate of the molten material 121 at the downstream location 203. In some embodiments, the feed-forward signal 247 can be determined at the same time or at a different time than when the feed-back signal 257 may be determined. For example, during operation of the glass manufacturing process 100, the feed-forward signal 247 may be determined at the same or different intervals as the feed-back signal 257. In some embodiments, because the feed-forward signal 247 is anticipatory, the feed-forward signal 247 may be determined more frequently than the feed-back signal 257 to compensate for shorter term changes within the glass manufacturing process 100. Conversely, because the feed-back signal 257 is reactionary, the feed-back signal 257 may be determined less frequently than the feed-forward signal 247 to compensate for longer term changes within the glass manufacturing process 100. In some embodiments, by employing both the feed-forward signal 247 and the feed-back signal 257 together, control of the flowrate of the molten material 121 at the downstream location 203 can be more accurate than, for example, a method employing only a feed-back signal 257 or a method employing only a feed-forward signal 247. Accordingly, methods and apparatus of the present disclosure which, in some embodiments, employ both a feed-forward control 245 and a feed-back control 255 can provide more accurate control of the viscosity of the molten material 121, resulting in more accurate control of the flowrate of the molten material 121 at the downstream location 203 and improved quality glass.

In some embodiments, a third predetermined flowrate 266 can also be provided to the summation control 265. In some embodiments, either or both of the feed-forward signal 247 and the feed-back signal 257 can be compared to the third predetermined flowrate 266. In some embodiments, if either or both of the feed-forward signal 247 and the feed-back signal 257 have already been compared, respectively, to the first predetermined flowrate 246 at the feed-forward control 245 and the second predetermined flowrate 256 at the feed-back control 255, the feed-forward signal 247 and the feed-back signal 257 would not also be compared to third predetermined flowrate 266 when passed to the summation control 265. However, if either or both of the feed-forward signal 247 and the feed-back signal 257 had not been compared, respectively, to the first predetermined flowrate 246 at the feed-forward control 245 and the second predetermined flowrate 256 at the feed-back control 255, prior to being passed to the summation control 265, the feed-forward signal 247 and the feed-back signal 257 could then be compared to third predetermined flowrate 266 once the feed-forward signal 247 and the feed-back signal 257 are passed to the summation control 265. The third predetermined flowrate 266 can correspond to a desired flowrate from which a glass ribbon 103 having particular attributes can be formed. The third predetermined flowrate 266 can be the same as (e.g., equal to) the first predetermined flowrate 246 provided to the feed-forward control 245 and the second predetermined flowrate 256 provided to the feed-back control 255. In some embodiments, the predetermined flowrate can be a constant value. In addition, in some embodiments, the predetermined flowrate can be altered to, for example, change a corresponding attribute of the glass ribbon 103 formed at the flowrate. For example, the glass manufacturing apparatus 101 and the glass manufacturing process 100 may be employed to form any one or more glass ribbons having any one or more characteristic attributes that may be dictated based at least in part on cost, efficiency, customer demand, and other considerations.

In some embodiments, a comparison between the estimated flowrate 240 from the feed-forward control 245 and the first predetermined flowrate 246 can indicate a particular manner in which to control the flowrate of the molten material 121. Likewise, in some embodiments, a comparison between the calculated flowrate 254 from the feed-back control 255 and the second predetermined flowrate 256 can indicate a particular manner in which to control the flowrate of the molten material 121. In some embodiments, a comparison between the estimated flowrate 240 from the feed-forward control 245, the calculated flowrate 254 from the feed-back control 255, and the third predetermined flowrate 266 (e.g., at summation control 265) can indicate a particular manner in which to control the flowrate of the molten material 121. Accordingly, as represented by arrow 270, a flowrate control signal 270 can be provided to control the flowrate of the molten material 121 at the downstream location 203. It is to be understood that the flowrate control signal 270 can include at least one of the feed-forward signal 247 from the feed-forward control 245 and the feed-back signal 257 from the feed-back control 255. For example, if the feed-forward signal 247 is employed alone to control the flowrate of the molten material 121, the flowrate control signal 270 can include the feed-forward signal 247 from the feed-forward control 245. If the feed-back signal 257 is employed alone to control the flowrate of the molten material 121, the flowrate control signal 270 can include the feed-back signal 257 from the feed-back control 255. In some embodiments, if the feed-forward signal 247 is employed together with the feed-back signal 257 to control the flowrate of the molten material 121, the flowrate control signal 270 can include the feed-forward signal 247 from the feed-forward control 245 and the feed-back signal 257 from the feed-back control 255.

In some embodiments, where the feed-forward signal 247 and the feed-back signal 257 may be employed together, the method can include calculating a viscosity of the molten material 121 at the upstream location 201. The method can include estimating the flowrate based on the calculated viscosity (e.g., at the flowrate estimator 225) and based on the calculated flowrate 254 (e.g., at the flowrate calculator 253). The method can include controlling the flowrate of the molten material 121 at the downstream location 203 based on the estimated flowrate 240 from both the flowrate estimator 225 including the feed-forward control 245 and the flowrate calculator 253 including the feed-back control 255. For example, in some embodiments, estimating the flowrate can include estimating a first flowrate (e.g., feed-forward signal 247) based on the calculated viscosity and estimating a second flowrate (e.g., feed-back signal 257) based on the calculated flowrate 254. As shown at summation control 265, in some embodiments, controlling the flowrate can include comparing the first estimated flowrate (e.g., feed-forward signal 247) and the second estimated flowrate (e.g., feed-back signal 257) to the third predetermined flowrate 266.

In some embodiments, controlling the flowrate can include adjusting a temperature of the molten material 121 at a midstream location 202 positioned between the upstream location 201 and the downstream location 203. For example, in some embodiments, the glass manufacturing apparatus 101 can include a temperature controller 275 (e.g., heating system, cooling system) to adjust the temperature of the molten material 121 at the midstream location 202. Adjusting the temperature of the molten material 121 at the midstream location 202 can adjust the flowrate of the molten material 121 at the downstream location 203. For example, increasing the temperature of the molten material 121 at the midstream location 202 can decrease the viscosity of the molten material 121 and, in turn, increase the flowrate of the molten material 121 at the downstream location 203. Conversely, decreasing the temperature of the molten material 121 at the midstream location 202 can increase the viscosity of the molten material 121, and, in turn, decrease the flowrate of the molten material 121 at the downstream location 203. In some embodiments, if the temperature at the midstream location 202 is not adjusted, the viscosity of the molten material 121 can remain the same as when the viscosity of the glass was calculated at the upstream location 201, in which case the flowrate of the molten material 121 at the downstream location 203 would also remain unchanged and would correspond to the estimated flowrate 240. In some embodiments, adjusting the temperature of the molten material 121 at the midstream location 202 can provide an adjusted flowrate of the molten material 121 at the downstream location 203, and the method can include forming a glass ribbon 103 from the molten material 121 at the adjusted flowrate.

In some embodiments, controlling the flowrate can include adjusting a temperature of the molten material 121 at the midstream location 202 based on the first estimated flowrate (e.g., feed-forward signal 247) and the second estimated flowrate (e.g., feed-back signal 257). Accordingly, in some embodiments, adjusting the temperature of the molten material 121 at the midstream location 202 can include a first temperature adjustment based on the first estimated flowrate (e.g., feed-forward signal 247) and a second temperature adjustment based on the second estimated flowrate (e.g., feed-back signal 257). In some embodiments, the first temperature adjustment and the second temperature adjustment can be performed at different times during the glass manufacturing process 100. In some embodiments, the first temperature adjustment and the second temperature adjustment can adjust the flowrate of the molten material 121 at the downstream location 203. In some embodiments, the first temperature adjustment and the second temperature adjustment can provide an adjusted flowrate of the molten material 121 at the downstream location 203, and the method can include forming a glass ribbon 103 from the molten material 121 at the adjusted flowrate.

In some embodiments, if the feed-forward control 245 determines that the estimated flowrate 240 is greater than the first predetermined flowrate 246, the feed-forward control 245 can proactively send a feed-forward signal 247 which passes to the temperature controller 275 as flowrate control signal 270 to decrease the temperature of the molten material 121 at the midstream location 202. Decreasing the temperature of the molten material 121 can increase the viscosity of the molten material 121 and decrease the flowrate of the molten material 121 at the downstream location 203. The feed-forward control 245 and the temperature controller 275 can perform this operation prior to the greater-than-desired flowrate occurring and can therefore provide an adjusted flowrate at which a higher quality glass ribbon 103 can be formed. Similarly, if the feed-forward control 245 determines that the estimated flowrate 240 is less than the first predetermined flowrate 246, the feed-forward control 245 can proactively send a feed-forward signal 247 to the temperature controller 275 to increase the temperature of the molten material 121 at the midstream location 202. Increasing the temperature of the molten material 121 can decrease the viscosity of the molten material 121 and increase the flowrate of the molten material 121 at the downstream location 203. The feed-forward control 245 and the temperature controller 275 can perform this operation prior to the less-than-desired flowrate occurring and can therefore provide an adjusted flowrate at which a higher quality glass ribbon 103 can be formed. In some embodiments, if the feed-forward control 245 determines that the estimated flowrate 240 is equal to or within an allowable range of the first predetermined flowrate 246, no action may be taken and the glass manufacturing process 100 can continue without adjusting the temperature of the molten material 121 at the midstream location 202 to provide a flowrate at the downstream location 203 equal to the estimated flowrate 240.

In some embodiments, if the feed-back control 255 determines that the calculated flowrate 254 is greater than the second predetermined flowrate 256, the feed-back control 255 can reactively send a feed-back signal 257 to the temperature controller 275 to decrease the temperature of the molten material 121 at the midstream location 202. Decreasing the temperature of the molten material 121 can increase the viscosity of the molten material 121 and decrease the flowrate of the molten material 121 at the downstream location 203. The feed-back control 255 and the temperature controller 275 can perform this operation only after the greater-than-desired flowrate occurred and can therefore provide an adjusted flowrate at which a higher quality glass ribbon 103 can subsequently be formed. Similarly, if the feed-back control 255 determines that the calculated flowrate 254 is less than the second predetermined flowrate 256, the feed-back control 255 can reactively send a feed-back signal 257 to the temperature controller 275 to increase the temperature of the molten material 121 at the midstream location 202. Increasing the temperature of the molten material 121 can decrease the viscosity of the molten material 121 and increase the flowrate of the molten material 121 at the downstream location 203. The feed-back control 255 and the temperature controller 275 can perform this operation only after the less-than-desired flowrate occurred and can therefore provide an adjusted flowrate at which a higher quality glass ribbon 103 can subsequently be formed. In some embodiments, if the feed-back control 255 determines that the calculated flowrate 254 is equal to or within an allowable range of the second predetermined flowrate 256, no action may be taken and the glass manufacturing process 100 can continue without adjusting the temperature of the molten material 121 at the midstream location 202.

In some embodiments, the temperature controller 275 can provide a signal to heat or cool the molten material 121 at the midstream location 202 as shown by arrow 276. In addition, as shown by arrow 277, the temperature controller 275 can receive a signal representing a temperature of the molten material 121 at the midstream location 202. Thus, by comparing the received temperature of the molten material 121 with the provided temperature, the temperature controller 275 can independently adjust the temperature at the midstream location 202 until a desired temperature of the molten material 121 corresponding to a desired viscosity is attained. In some embodiments, the temperature controller 275 can operate to heat or cool the molten material 121 in a continuous iterative process, with or without additional input of the flowrate control signal 270 from the method until the desired temperature of molten material 121 at the midstream location 202 is achieved. Accordingly, the desired temperature of the molten material 121 at the midstream location 202 can provide a desired viscosity of the molten material 121 which, in turn, can provide a desired flowrate of the molten material 121 at the downstream location 203 resulting in glass ribbon 103 formed at the flowrate that is of a desired quality.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is to be understood that, as used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A method of controlling a flowrate of molten material at a downstream location in a glass manufacturing process comprising:
    mixing the molten material at an upstream location with a shaft comprising a plurality of protrusions, the upstream location positioned upstream from the downstream location relative to a flow direction of the molten material;
    measuring a torque of the shaft;
    measuring a level of the molten material at another upstream location;
    calculating a viscosity of the molten material at the upstream location based on the measured torque and the measured level;
    estimating the flowrate based on the calculated viscosity; and
    controlling the flowrate of molten material at the downstream location based on the estimated flowrate.

2. The method of claim 1, wherein controlling the flowrate of molten material comprises comparing the estimated flowrate to a predetermined flowrate.

3. The method of claim 1, wherein controlling the flowrate of molten material comprises adjusting a temperature of the molten material at a midstream location positioned between the upstream location and the downstream location based on the estimated flowrate.

4. The method of claim 3, wherein adjusting the temperature of the molten material at the midstream location adjusts the flowrate of the molten material at the downstream location.

5. The method of claim 3, wherein adjusting the temperature of the molten material at the midstream location provides an adjusted flowrate of the molten material at the downstream location, the method further comprising forming a glass ribbon from the molten material at the adjusted flowrate.

6. The method of claim 1, wherein measuring the torque of the shaft comprises rotating a rotor mounted to the shaft relative to a stator, and wherein the stator is positioned to receive a signal from the rotor without physically contacting the rotor and without physically contacting the shaft.

7. The method of claim 6, wherein the rotor is mounted to the shaft between two electrically nonconductive connectors.

8. The method of claim 6, wherein the rotor is mounted to the shaft with a double-flex coupler positioned between the rotor and the plurality of protrusions.

9. A method of controlling a flowrate of molten material at a downstream location in a glass manufacturing process comprising:
    forming a glass ribbon from the molten material at the flowrate;
    calculating the flowrate of the molten material from which the glass ribbon was formed;
    calculating a viscosity of the molten material at an upstream location positioned upstream from the downstream location relative to a flow direction of the molten material;
    estimating the flowrate based on the calculated viscosity and the calculated flowrate; and
    controlling the flowrate of the molten material at the downstream location based on the estimated flowrate.

10. The method of claim 9, wherein calculating the flowrate of the molten material from which the glass ribbon was formed comprises separating a glass sheet from the glass ribbon and measuring a weight of the glass sheet.

11. The method of claim 9, wherein estimating the flowrate comprises estimating a first flowrate based on the calculated viscosity and estimating a second flowrate based on the calculated flowrate, and wherein controlling the flowrate comprises comparing the first estimated flowrate and the second estimated flowrate to a predetermined flowrate.

12. The method of claim 11, wherein controlling the flowrate of molten material comprises adjusting a temperature of the molten material at a midstream location positioned between the upstream location and the downstream location based on the first estimated flowrate and the second estimated flowrate.

13. The method of claim 12, wherein adjusting the temperature of the molten material at the midstream location comprises a first temperature adjustment based on the first estimated flowrate and a second temperature adjustment based on the second estimated flowrate.

14. The method of claim 13, wherein the first temperature adjustment and the second temperature adjustment are performed at different times during the glass manufacturing process.

15. The method of claim 13, wherein the first temperature adjustment and the second temperature adjustment adjust the flowrate of the molten material at the downstream location.

16. The method of claim 13, wherein the first temperature adjustment and the second temperature adjustment provide an adjusted flowrate of the molten material at the downstream location, the method further comprising forming a glass ribbon from the molten material at the adjusted flowrate.

17. The method of claim 9, further comprising:
mixing the molten material at the upstream location with a shaft comprising a plurality of protrusions;
measuring a torque of the shaft;
measuring a level of the molten material at another upstream location; and
calculating the viscosity of the molten material at the upstream location based on the measured torque and the measured level.

18. The method of claim 17, wherein measuring the torque of the shaft comprises rotating a rotor mounted to the shaft relative to a stator, and wherein the stator is positioned to receive a signal from the rotor without physically contacting the rotor and without physically contacting the shaft.

19. The method of claim 1, wherein the another upstream location is positioned upstream of the upstream location.

20. The method of claim 17, wherein the another upstream location is positioned upstream of the upstream location.

* * * * *

UNITED STATES PATENT AND TRADEMARK OFFICE
CERTIFICATE OF CORRECTION

| | | |
|---|---|---|
| PATENT NO. | : 11,319,238 B2 | Page 1 of 1 |
| APPLICATION NO. | : 16/327092 | |
| DATED | : May 3, 2022 | |
| INVENTOR(S) | : Mark Alan Cook et al. | |

It is certified that error appears in the above-identified patent and that said Letters Patent is hereby corrected as shown below:

On the Title Page

On the page 2, item (56), in Column 1, under "U.S. Patent Documents", Line 1, delete "Sch?b et al." and insert -- Schab et al. --.

In the Specification

In Column 1, Line 11, delete "2016" and insert -- 2016, --.

Signed and Sealed this
Thirteenth Day of December, 2022

*Katherine Kelly Vidal*

Katherine Kelly Vidal
*Director of the United States Patent and Trademark Office*